THOMAS E. MARABLE.
Improvement in Baling Presses.
No. 120,297. Patented Oct. 24, 1871.
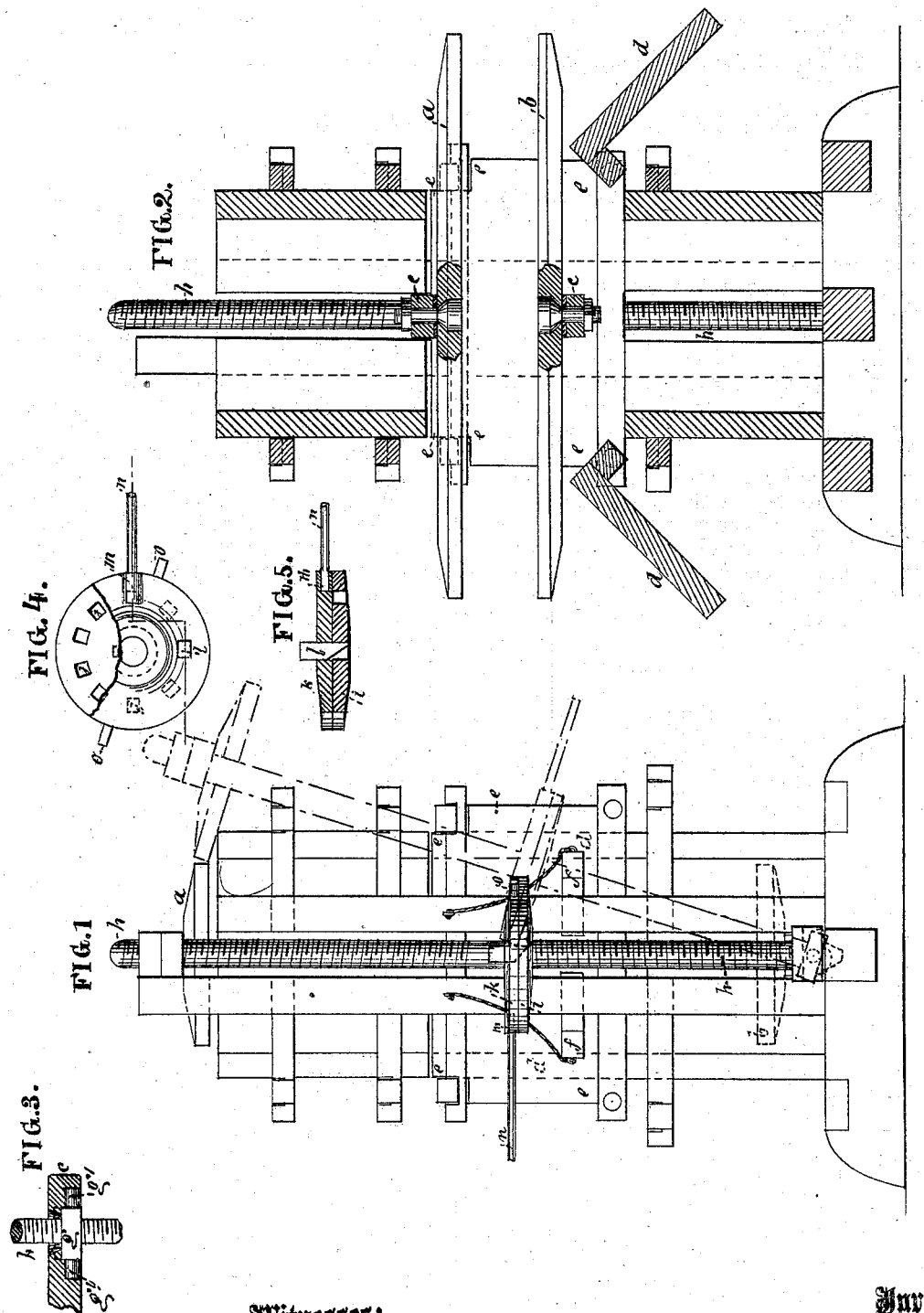
Witnesses:
G. Mathys.
Thomas D. D. Durand.
Inventor:
Thomas E. Marable.
Per ____
Attorneys.

UNITED STATES PATENT OFFICE.

THOMAS E. MARABLE, OF PETERSBURG, VIRGINIA, ASSIGNOR TO HIMSELF, JOSEPH B. DUNN, AND STARKE A. PLUMMER, OF SAME PLACE.

IMPROVEMENT IN BALING-PRESSES.

Specification forming part of Letters Patent No. 120,297, dated October 24, 1871.

*To all whom it may concern:*

Be it known that I, THOMAS E. MARABLE, of Petersburg, in the county of Dinwiddie and State of Virginia, have invented a new and Improved Baling-Press; and I do hereby declare the following to be a full, clear, and exact description of the same, reference being had to the accompanying drawing making a part of this specification, in which—

Figure 1 is an end elevation, showing the upper follower raised to the top of the press and swung aside. Fig. 2 is a transverse vertical section, showing the followers turned to one side. Fig. 3 is a detached section, showing the hinged nut. Fig. 4 is a top view of the ratchet, with part of the upper disk broken away so as to show the holes in the lower disk; and Fig. 5 is a transverse vertical section through the ratchet, showing the shape of the pin.

This invention relates to a baling-press, in which the followers are pivoted to their beams in such a manner that when the side-doors are opened and the followers brought opposite them the followers may be turned crosswise of the press, so as to cause the ends of the bale to protrude at either side, thus enabling the bale to be capped at the ends before removing it from the press.

Referring to the drawing, $a$ is the upper and $b$ the lower follower, these being pivoted at their centers to the beams $c$. As shown in Fig. 2, these followers can be turned transversely of the press whenever they are opposite the side-doors $d$ and the latter are opened, conditions that are fulfilled when the pressure upon a bale has been completed. As presses are usually constructed, the bale has to be pushed out of the press before its ends can be capped; and in pushing it out the ends of the bale are apt to be torn and roughened by contact with the ends of the press. This is avoided in my press by turning both followers with the bale between them on their pivots, thus causing the ends to swing out of the press without roughening its end, which can then be easily capped before removing the bale from the press. The same thing can be accomplished by making the end pieces $e$ removable. These are held in place by means of keys $f$ pressing them against the ends of the side doors. By knocking out the keys the end pieces become loose and can be readily taken out, thus exposing the ends of the bale. The nuts $g$ in the lower follower-beam $c$, through which the screws $h$ pass, are cast with trunnions $g'$, Fig. 3, which extend lengthwise of the beam, entering sockets therein, one at each end of the nut. This arrangement enables the upper follower, when raised to the top of the press, to be turned aside so as to uncover it for convenience in recharging the press. The holes in the lower beam $c$, through which the screws $h$ pass, are sufficiently large to give the screws side play enough to permit the upper follower thus to swing. Each right-and-left screw $h$ has a ratchet for turning it, consisting of a disk, $i$, fixed on the screw, and having a circular series of holes, $j$, made through it, and an upper disk, $k$, loose on the screw, and having one hole made through it, in which sits a pin, $l$, the lower end of which is beveled, as shown in Fig. 5. The upper disks $k$ have sockets $m$ on their peripheries, into which bars $n$ fit. These disks have also pins $o$ extending radially from diametrically opposite points in their peripheries.

When the pin $l$ occupies the hole in the upper disk, and also one of the holes in the lower disk, by turning the upper disk so as to press the vertical side of the lower end of the pin $l$ against the end of the hole $j$, in which it sits, the lower disk is turned with the upper one and rotates the screw. This turning, when the press is at work, is done by means of the levers $n$. When the lever, after moving forward as far as possible, is turned back for a fresh hold, the beveled side of the pin $l$ being pressed against the end of the hole, the pin rises out of the hole, disconnecting the two disks, so that the upper one can be turned back without moving the lower one. Hence the screw stands still at every backward turn of the upper disk. The shifting of the pin $l$ side for side in the holes causes it to reverse its operation and turn the screw in the contrary direction from what it turned it before. When there is nothing in the press the ratchet can be more rapidly operated by unshipping the lever $n$ and working it by means of the pins *o*. These pins can also be profitably used at the beginning of the pressing operation when the resistance is small.

Having thus described my invention, what I claim as new, and desire to secure by Letters Patent, is—

1. The followers *a b*, when pivoted to their bars, as specified.

2. The combination of the beam *c*, hinged nuts *g*, screws *h*, and upper follower *a*, as described.

T. E. MARABLE.

Witnesses:
SOLON C. KEMON,
THOS. D. D. OURAND. (7)